C. E. JOHANSSON.
ACCURATE MEASURING GAGE.
APPLICATION FILED MAY 3, 1916.
1,363,654.
Patented Dec. 28, 1920.
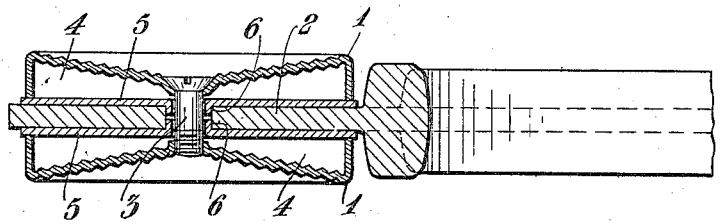
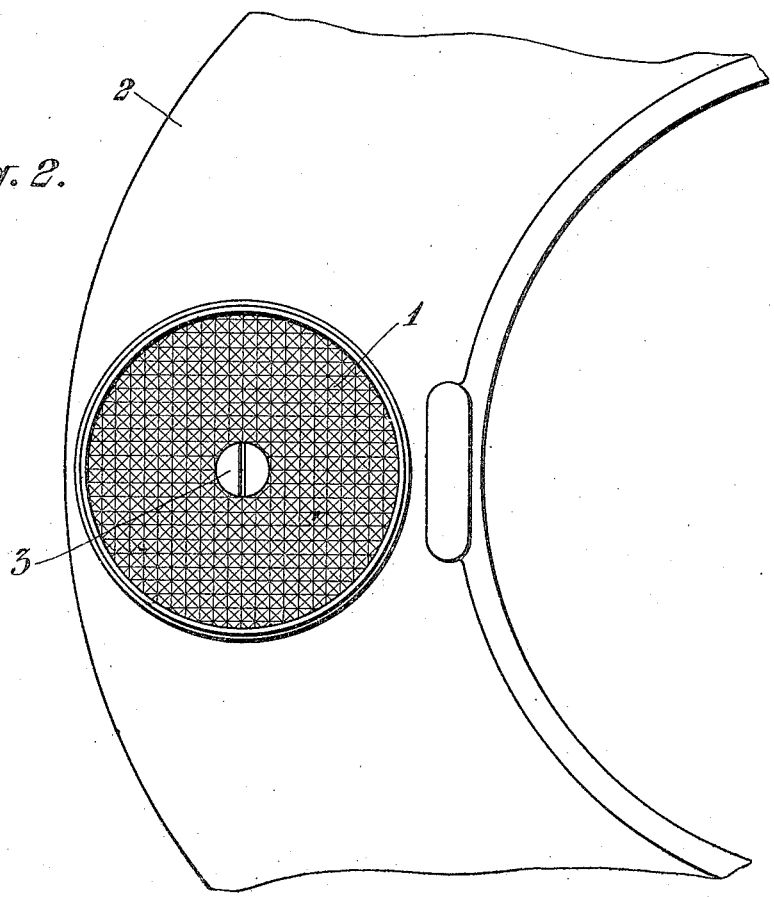
Inventor:
Carl Edward Johansson.

UNITED STATES PATENT OFFICE.

CARL EDVARD JOHANSSON, OF ESKILSTUNA, SWEDEN, ASSIGNOR TO AKTIEBOLAGET C. E. JOHANSSON, OF ESKILSTUNA, SWEDEN.

ACCURATE MEASURING-GAGE.

1,363,654.     Specification of Letters Patent.     Patented Dec. 28, 1920.

Application filed May 3, 1916. Serial No. 95,034.

*To all whom it may concern:*

Be it known that I, CARL EDVARD JOHANSSON, a subject of the King of Sweden, residing at Eskilstuna, in the Kingdom of Sweden, have invented a new and useful Improvement in Accurate Measuring-Gages, of which the following is a specification.

In my co-pending application, Serial No. 867,780, filed Oct. 21, 1914, I have described an improvement in accurate measuring gages for insulating the gage from the heat of the hand when the gage is being used. Said improvement consists of plates or washers of insulating material attached to the sides of the measuring gage touched by the fingers when using the same, said plates being provided with recesses on the sides directed toward the gage which recesses decrease the surfaces of contact with the gage and form insulating air spaces between the plates and the gage.

The air inclosed in these air spaces is less conductive for heat than the plates themselves, but it easily transmits radiant heat. On account of this it may happen, when a gage thus insulated is continuously used for a long time, that the insulating plates themselves become so much heated that the heat radiating from the same through the air spaces may perceptibly affect the frame of the gage and cause the same to expand.

My present invention refers to an improvement in the arrangement disclosed and claimed in my said co-pending application Serial No. 867,780, and has for its object to remove the said disadvantage. The present improvement consists broadly in this that washers of a heat-insulating material are arranged between the plates and the frame of the gage in such manner that they cover the portions of the faces of the frame directed toward the plates or toward the insulating air spaces, whether these are provided in the faces of the plates directed toward the frame, or in the faces of the frame directed toward the plates, or in both. These washers, which may be comparatively thin and be made of for instance paper board, fiber, or the like, prevent the heat radiating through the air spaces from acting upon the frame, and as besides the direct conduction of heat from the heated insulating plates to the frame of the gage is also rendered more difficult on account of these washers, this improved arrangement answers its purpose exceedingly well. It has even proved possible to substitute for the outer insulating plates which serve as holding-pieces, thin plates of metal without the gage becoming perceptibly affected by the heat of the hand.

In order to provide against heat conduction through the screw or the rivet serving for connecting the plates with the frame, the edges of the washers may suitably be folded inward into the hole in the frame for the screw or the rivet, in such manner that these folded or turned-in edges form short tubes extending into the hole in the frame and forming an insulating sleeve in the same.

An embodiment of the present invention is shown by way of example in the accompanying drawing, Figure 1 being a section through a portion of a gage provided with an insulating means according to this invention, and Fig. 2 showing a plan view of a portion of the gage.

The plates 1, which consist either of an insulating material, such as fiber, hard rubber, or the like, or of thin sheet iron or other sheet metal, are attached, as in the construction described in my said application Serial No. 867,780, on each side of the frame 2 and secured to this frame by means of a screw 3. The plates 1 are provided with recesses or depressions 4 on their sides directed toward the frame 2. These recesses constitute the insulating air spaces. Washers 5 of paper board, fiber, or the like are provided between the plates 1 and the frame 2, which washers protect the frame from becoming heated either by radiation or by conduction from the plates or holding-pieces 1. The edges 6 of the washers 5 are for this purpose folded into the hole in the frame 1 for the screw 3 so that they form sleeves around the same.

The threads for the screw and the countersinking for the head of the same are made in the plate 1.

I claim:

1. The combination with a gage, of finger plates provided with recesses on the side of the same facing the gage, said recesses forming air spaces between said finger plates and the gage, and insulating washers between said air spaces and the gage which washers cover the sides of the gage facing the air spaces, thus preventing the heat radiating from the finger plates through the air spaces from acting upon the gage.

2. The combination with a gage provided with a hole, of finger plates provided with recesses on the side of the same facing the gage, a screw projecting through the hole in the gage and securing the finger plates, and insulating washers between said finger plates and the gage which washers cover the sides of the gage facing the finger plates, and the edges of which washers are folded into the hole in the gage forming insulating sleeves around the screw, substantially as and for the purpose set forth.

CARL EDVARD JOHANSSON.